United States Patent [19]

Brackmann

[11] Patent Number: 5,142,161
[45] Date of Patent: Aug. 25, 1992

[54] HAND-HELD OPTICAL SCANNER AND HIGHLIGHTER

[76] Inventor: Rogers F. Brackmann, 27 W. 145 Mack Rd., Wheaton, Ill. 60187

[21] Appl. No.: 515,057

[22] Filed: Apr. 26, 1990

[51] Int. Cl.⁵ ............... G06K 7/10; B43K 25/00
[52] U.S. Cl. ................... 250/566; 250/227.13; 235/472; 382/59; 401/52; 401/195
[58] Field of Search ............... 235/472; 382/59, 65; 250/566, 227.13, 568, 221; 401/195, 52, 48

[56] References Cited

U.S. PATENT DOCUMENTS

| | | | |
|---|---|---|---|
| 2,937,917 | 5/1960 | Anthony | 346/139 |
| 2,979,602 | 4/1961 | Barnett | 240/6.46 |
| 3,035,118 | 5/1962 | Scheuzger | 178/18 |
| 3,444,465 | 5/1969 | Teixeira | 324/72.5 |
| 3,761,620 | 9/1973 | Graven | 178/18 |
| 3,879,859 | 4/1975 | English | 401/195 |
| 3,963,914 | 6/1976 | Browning et al. | 401/195 |
| 4,034,155 | 7/1977 | Muller et al. | 178/19 |
| 4,047,017 | 9/1977 | Herring | 240/6.46 |
| 4,180,204 | 12/1979 | Koenig et al. | 235/472 |
| 4,475,240 | 10/1984 | Brogardh et al. | 382/59 |
| 4,518,274 | 5/1985 | Hanggi | 401/195 |
| 4,553,035 | 11/1985 | Malinsky | 250/566 |
| 4,574,317 | 3/1986 | Scheible | 235/472 |
| 4,748,318 | 5/1988 | Bearden et al. | 235/472 |
| 4,760,606 | 7/1988 | Lesnick et al. | 382/61 |

Primary Examiner—David C. Nelms
Assistant Examiner—Michael Messinger
Attorney, Agent, or Firm—Jacques M. Dulin; Thomas C. Feix

[57] ABSTRACT

Special holder for combination of an umbilical type scanner with an inking highlighter in an integral or piggy back unit, which upon use provides a visual record of what has been scanned as well as "scan field verification" which obviates the need to continuously call up the computer display to determine the scan accuracy. The use of a highlighter improves the contrast between the print and the background paper (or other substrate), particularly in the case of poor quality paper, such as newsprint or recycled paper. This results in a "cleaner" digital signal and higher degree of scan accuracy, i.e. a better recognition read by the graphics/text software. Several embodiments of special holders are shown, a principal one being a side-by-side (tandem) pair of sleeves joined by a web, one sleeve being adapted to hold a conventional pen or wand-type scanner, and the other adapted to hold a conventional highlighter. In alternate embodiments a special "donut" holder comprising a cylinder with a felt highlighter tip is provided into the axial bore of which is inserted a conventional or specially designed scanner. In still another embodiment an angled highlighter may be clipped to a wand-type scanner. Scanning may be done with the highlights proceeding or trailing the scanner in the case of the arrangement. In the case of the "donut" type scanner/highlighter, the highlighting procedes the scanning, and the unit is omni-directional.

14 Claims, 2 Drawing Sheets

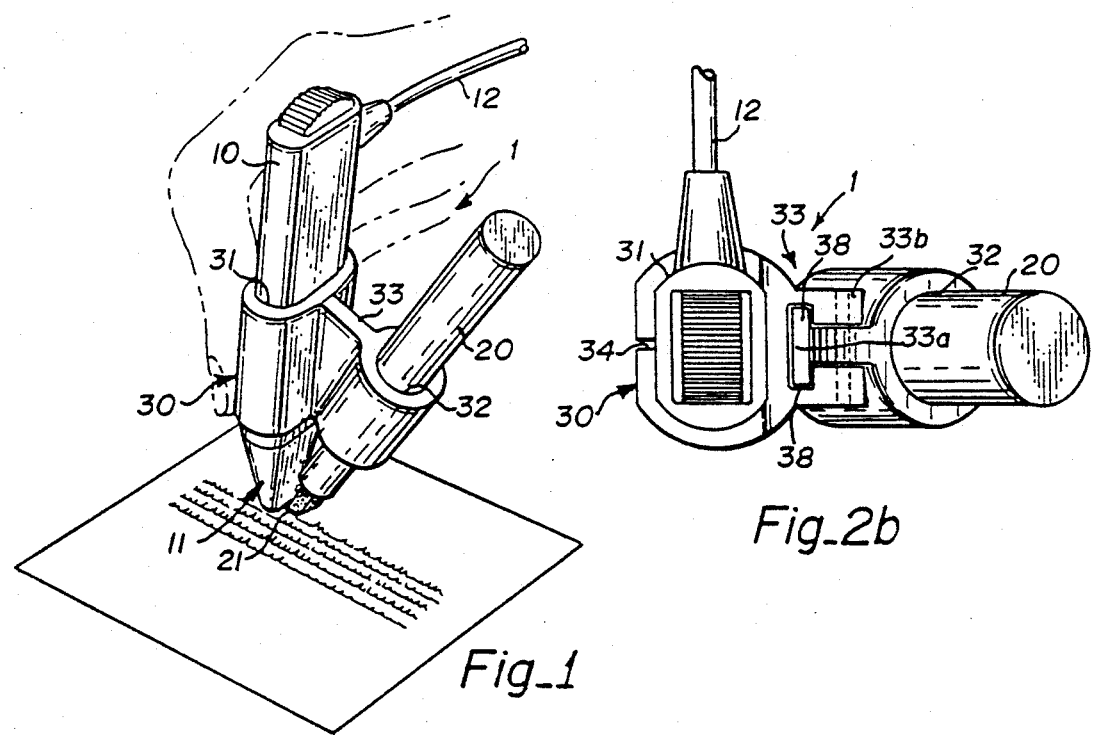
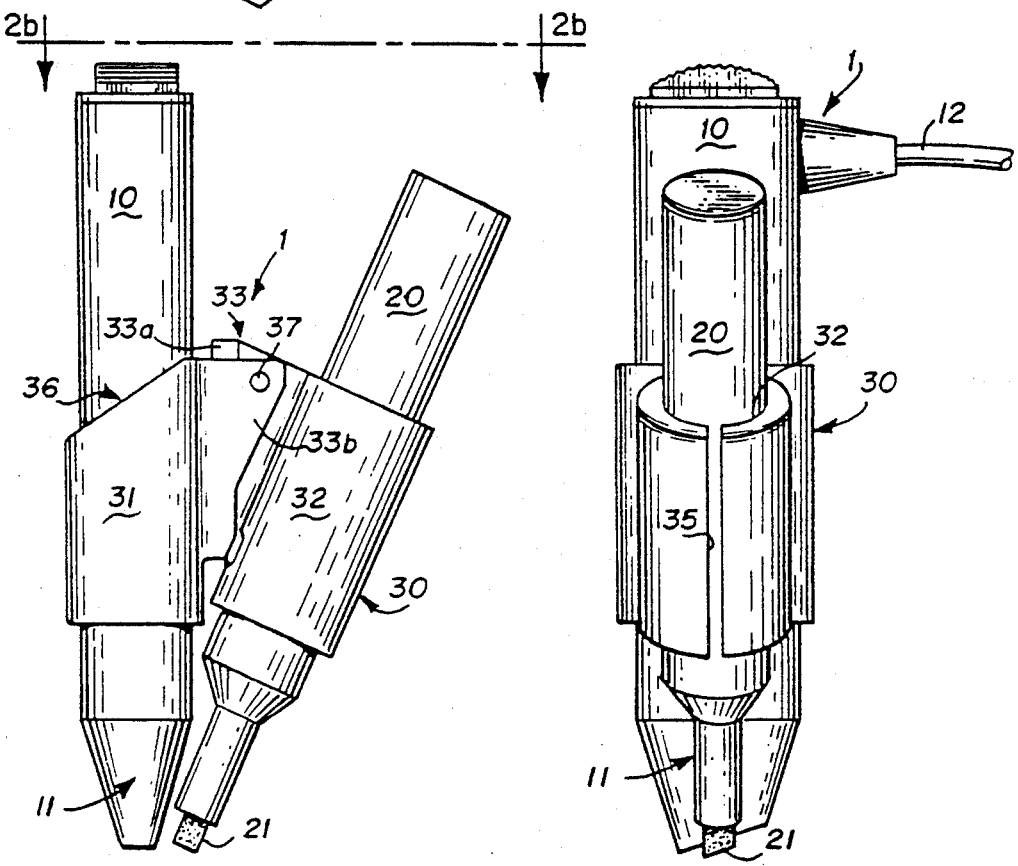
Fig_1
Fig_2b
Fig_2a
Fig_2c

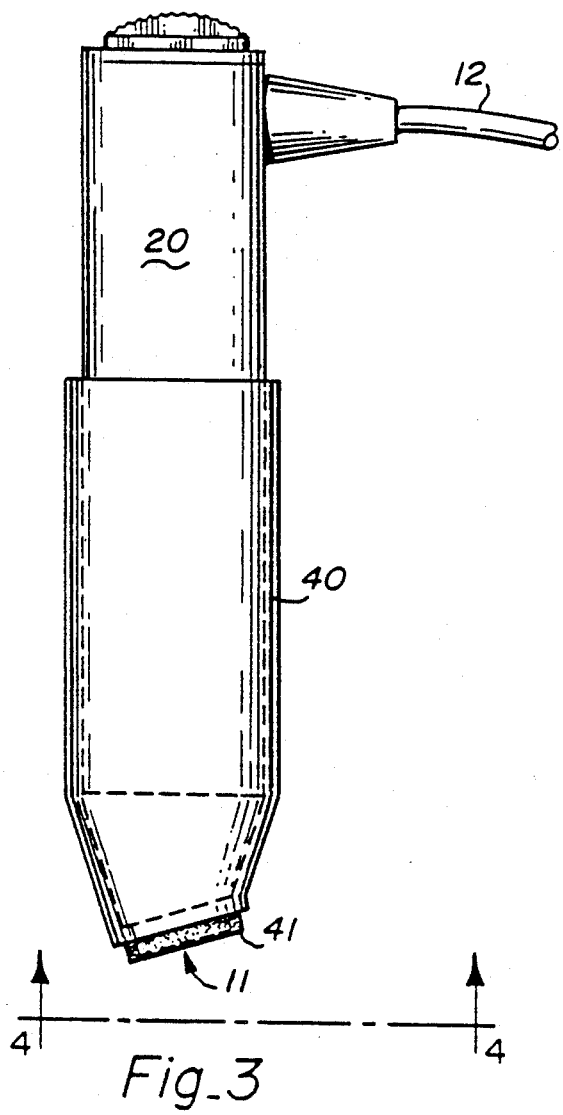
Fig_3
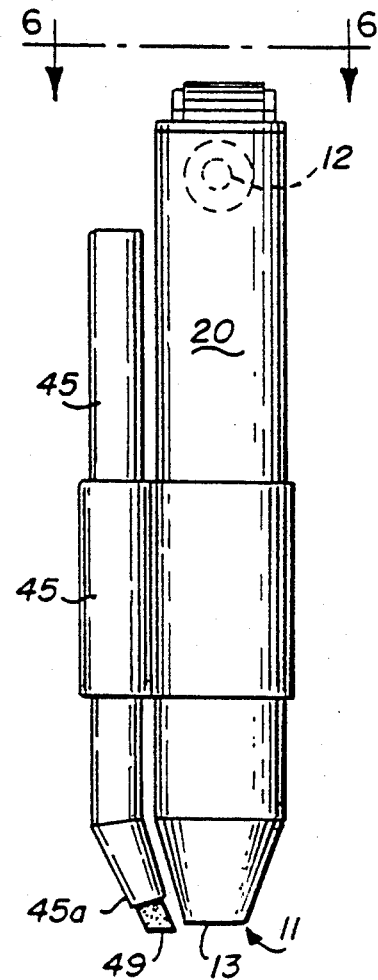
Fig_5
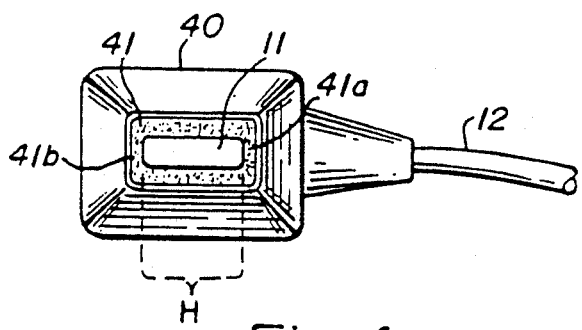
Fig_4
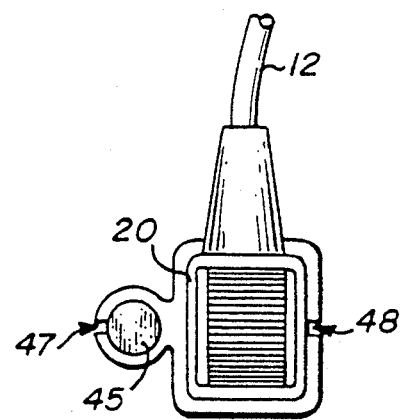
Fig_6

HAND-HELD OPTICAL SCANNER AND HIGHLIGHTER

FIELD

The present invention relates generally to hand-held optical scanners for use in outlining, cut-and-paste editing, and the like data entry applications associated with personal computers. More particularly, the invention relates to a combination hand-held optical scanner with attached highlighter for selective and enhanced scanning capabilities.

BACKGROUND

Since the advent of computerized word processing, the ability to "cut and paste" selected portions of text hand-keyed in from a document has been a standard feature in nearly all computer word processing programs The applications programs permit the text entered from a document to be manipulated within the memory of the computer for rearrangement for a particular new output document Recently, hand held optical scanners have given traditional cut and paste methods added capability and increased convenience by allowing the user of such devices to select and scan lines of text or illustrations from printed hard copy material and store them in the memory of a computer.

A problem with hand scanners is that the user must pay close attention and have a steady hand and good eye in order to get good scanning results Otherwise, portions of the desired material to be scanned may be missed. This is especially true in the areas of the scanned material adjacent the outside edges of the scanning beam. It is therefore typical to require an additional guide device to provide proper tracking of the scanning instrument, as well as provide an instantaneous record of the area scanned so that repeated passes to recover missed material are obviated The art has numerous teachings relating to writing and recording instruments. For example, it is known in the art to combine a light source with a writing instrument to facilitate the user of the writing implement. This first group of writing/lighting references includes U.S. Pat. Nos. 2,979,602 (Barnett, 1961) and 4,518,274 (Hanggi, 1985) which provide writing instruments with various illumination means. U.S. Pat. No. 3,879,859 (English, 1975) teaches combining a light source with a marking pen for use in combination with a specially adapted translucent screen as a method of visual instruction for young students. Other examples of a combination flashlight and writing instrument include U.S. Pat. Nos. 3,963,914 (Browning et al., 1976) and 4,047,017 (Herring, 1977).

It is also known in the art to provide a pen or like writing instrument with means to electronically record or input data for use in tele-autographic and graphic communication systems. This second group of writing-/recording devices include U.S. Pat. Nos. 2,937,917, (Anthony, 1957), 3,035,118 (Scheuzger, 1962). U.S. Pat. No. 3,444,465 (Teixeira, 1969) teaches to use a standard metallic ballpoint pen as a probe for a graphic communication system. U.S. Pat. No. 4,034,155 (Muller et al., 1977) discloses an electrical sensing writing pen capable of sensing and amplifying a varying electrostatic field. U.S. Pat. No. 3,761,620 (Graven, 1973) teaches to use a light source that is housed within a pen (pen light) to activate a grid or matrix of light sensing semiconductors under a specially constructed writing medium for graphical data input of the pen strokes of the light pen on the writing surface to a computer display screen.

A common thread among the above mentioned second group of combinational writing/recording instruments is that they require a specialized writing surface and/or transmitting apparatus in order to cooperate with the graphic display and memory of the computer It is also known in the prior art to provide a hand held optical scanning device for scanning printed text or graphic illustrations from a hard copy documents to the memory of a computer. These scanning devices, commonly referred to as hand scanners are generally classifiable as "Graphics" hand scanners or "Optical Character Readers" (hereinafter designated generally as "OCR") hand scanners. Both Graphics and OCR hand scanners rely on bit-mapped graphics and use a bright light (eg. a row of light emitting diodes (LEDs), usually red) located under the device to light up the san area.

U.S. Pat. No. 4,475,240 (Brogardh et al., 1984) discloses a Graphics-type scanning device for the simultaneous generation and detection of markings for data input into a computer. Examples of commercially available Graphics hand scanners include: The Complete Hand Scanner by The Complete PC; the Handy Scanner HS-2000 DFI Inc.; ScanMan by Logitech Inc.; the DataSweep 1 and DataSweep PencilWand by Soricon Corporation; and the PB-PS1000 Pocket Scanner by Packard Bell.

U.S. Pat. No. 4,553,035 (Malinsky et al , 1985) discloses a hand held scanner using an optical character recognition system which is used for converting makings on a surface to an electrical signal. Examples of commercially available OCR hand scanners include the Saba Handscan by Saba Technologies Inc., and the Transimage 1000 by Transimage Corp.

While scanners in general do not require a specialized writing surface in order to scan text and transfer the image to a screen display, hand held scanners in particular do have other drawbacks in addition to the serious drawback of not being able to show a record on the hard copy of what has been previously scanned.

A scanner translates a hard-copy image into a computer image by shinning a light source on the image to be scanned and then measures the light reflected from the picture. It then converts the highest reading (whites) to 0s and the lower reading (blacks) to 1s. More sophisticated scanners can approximate the levels of grey found in the picture by measuring the intensity of the black on the picture so that it can generate replicable dot patterns in the stored image.

Hand scanners have problems with their ability to distinguish between areas of varying or poor contrast. For example, halftones are problems for Graphics hand scanners, and are registered either as all white or an undesirable shade of grey.

Similarly, even small amounts of grey in the white background of printed black text causes character recognition difficulties for most OCR scanners. Low grade white paper, such as is commonly used for newspapers and magazines or recycled paper, only appears white to the human eye. Such "white" paper really contains a myriad of colors and printing on them is difficult for the scanners to distinguish. The scanner's misread incidence goes up dramatically to the point where the resulting "read" is gibberish.

Thus, there is a definite need in the art to provide a hand held scanner that has improved contrast and resolution capabilities There is also a need for providing a hand scanner with means for physically marking the hard copy scanned material so that the user has a record of what has been previously scanned.

THE INVENTION DRAWINGS

FIG. 1 is an isometric view of a combination fiber-optical handheld scanner and fluid ink-filled highlighter constructed in accordance with one embodiment of the present invention. FIG. 1 also shows how a user's hand is positioned about the combination scanner/highlighter.

FIG. 2a is a front elevation view of the combination scanner/highlighter of FIG. 1

FIG. 2b is a top plan view taken along the line and in the direction indicated by the arrows 2b—2b in FIG. 2a.

FIG. 2c is a side elevation view of the combination scanner/highlighter of FIG. 1.

FIG. 3 is a side elevation view of a first alternate embodiment of the present invention.

FIG. 4 is a bottom plan view of the first alternate embodiment of FIG. 3 taken along the line and in the direction indicated by the arrows 4—4 in FIG. 3.

FIG. 5 is a front elevation view of a second alternate embodiment of the present invention.

FIG. 6 is a top plan view of the second alternate embodiment of FIG. 5 taken along the line and in the direction indicated by the arrows 6—6 in FIG. 5. SUMMARY The invention comprises the combination of an umbilical type scanner with an inking highlighter in an integral or piggy back unit, which upon use provides a visual record of what has been scanned as well as "scan field verification" which obviates the need to continuously call up the computer display to determine the scan accuracy. In addition, the use of a highlighter improves the contrast between the print and the background paper (or other substrate), particularly in the case of poor quality paper, such as newsprint or recycled paper. This results in a "cleaner" digital signal and higher degree of scan accuracy, i.e. a better recognition read by the graphics/text software.

Several embodiments of special holders are shown, a principal one being a side-by-side (tandem) pair of sleeves joined by a web, one sleeve being adapted to hold a conventional pen or wand-type scanner, and the other adapted to hold a conventional highlighter. In alternate embodiments a special "donut" holder comprising a cylinder with a felt highlighter tip is provided into the axial bore of which is inserted a conventional or specially designed scanner. In still another embodiment an angled highlighter may be clipped to a wand-type scanner.

Scanning may be done with the highlighter preceeding or trailing the scanner in the case of the tandem arrangement. In the case of the "donut" type scanner/highlighter, the highlighting precedes the scanning, and the unit is omni-directional or bi-directional.

Detailed Description of the Best Mode

The following detailed description illustrates the invention by way of example, not by way of limitation of the principles of the invention This description will clearly enable one skilled in the art to make and use the invention, and describes several embodiments, adaptations, variations, alternatives and uses of the invention, including what I presently believe is the best mode of carrying out the invention.

A combination hand-held scanner and fluid ink highlighter (hereinafter referred to simply as a "scanner/highlighter") constructed in accordance with the present invention is indicated generally by the reference numeral 1 in FIG. 1.

The scanner/highlighter 1 comprises a pen or wand type hand held scanner 10, a fluid filled ink highlighter 20, and double bracket assembly 30 for holding the highlighter 20 in a fixed spaced relationship with the scanner 10. A user's hand (shown in phantom) grasps the combination scanner/highlighter 1, for example, substantially as shown in FIG. 1.

By way of example, wand type scanners, such as the DataSweep® PencilWand manufactured by SORICON Corporation of Boulder, Colo., are ideally suited for use in the present invention. The length and thickness of these type of scanners permit the user to comfortably grasp and use the scanner. It is understood, however, that other types of hand held scanners having different shapes or housing configurations, may be used in combination with a highlighter and bracket assembly of the present invention with equally good results.

The highlighter 20 may be any conventional fluid filled ink marker such as the kind commonly sold in book stores and used by students for highlighting text in their books. For purposes of illustration only, the highlighter 20 is shown as being cylindrical in cross section. It is understood that other cross-sectional shapes for the highlighter may include, but need not be limited to, squares, rectangles, squares or rectangles with rounded corners, etc.

The bracket assembly 30 further comprises a bridge member or web 33 connecting two holder sleeves, designated generally as the scanner holder sleeve 31 and the highlighter holder sleeve 32, for receiving and retaining the scanner 10 and highlighter 20, respectively. In the embodiment of FIGS. 1 and 2a-2c, the bridge member 33 is basically shaped like an inverted triangle viewed from a front elevation view when the scanner/highlighter is in actual use. This triangular shape permits a conventional straight highlighter to be properly angled so that the tip 21 of the highlighter 20 may be positioned closely adjacent the scanner tip 11.

The desired materials for construction of the bridge member 30 include but are not limited to injection molded plastics, or easily machinable materials such as delrin or stock aluminum. It is only required that the material have some spring-like elasticity so that the holders 31 and 32, both having an opening or inner diameter marginally smaller the corresponding outer diameter of the intended article to be held so that a tight or "snap fit" is created. (That is, the outer diameter of the scanner 10 is to be marginally greater than the inner diameter of the scanner holder 31, and similarly for the outer diameter of the highlighter 20 and the corresponding inner diameter of the highlighter holder 32).

While both the scanner holder 31 and highlighter holder 32, as shown, only enclose a partial length of the scanner 10 and highlighter 20, respectively, it is understood that a full length, or, for that matter, any length enclosure may be feasible to fixedly retain the highlighter in a desired spaced relationship to the scanner. Similarly, although the bridge member 33, as shown, pans the entire vertical height of both holders 31 and 32, it may be shorter, include apertures therethrough to save weight, or add aesthetic appeal. Indeed, it is desireable to have a relieved area in the lower portion of the bridge member 33 adjacent the tip end of the combination scanner/highlighter to accommodate the thumb of the user during use; i.e., the user's hand essentially grasps the scanner unit, not the combined scanner highlighter. Alternately, the holder sleeves and web may be positioned higher (further up from the tips) of the scanner and/or highlighter to better accommodate the user's hand to grasp only the wand-type scanner. In all cases, the bracket assembly 30 is ergonomically dimensioned to cooperate with the user's hand and yet does not interfere with or disrupt the function of the electrical connector 12.

FIGS. 2a, b and c show a series of plan and elevation views of the combination scanner/highlighter 1. As is best seen in FIG. 2a, an edge portion 36 of the scanner holder 31 has been rounded off. This reduces chafing to the medial area between the user's thumb and index finger and is designed to enhance the ergonomic fit of the invention within the user's hand.

As best seen in FIGS. 2a and 2b, the bridge member 33 may comprise two parts, including generally T-shaped male portion 33a and correspondingly T-shaped mating female portion 33b, and a locking pin or spring-biased detent 37 for securing the male portion 33a within the female portion 33b. As shown, the male portion 33a and female portion 33b fit together in a snug "tongue in groove" fashion. Note, the bridge member 33 and bracket assembly 30 may also be a single integral piece as shown in FIG. 1.

If a degree of angular adjustment of the bridge member 33 is desired, the flange portions 33a and b (see FIG. 2b) may be modified or even completely removed, with a pivot replacing pin 37 so that the tip 21 of the highlighter 20 may swing (rotate) closer to or further away from the scanner tip 11. A wing nut, or like binding means may be incorporated into pin 37 to permit adjustment to the angular movement between the male portion 33a and female portion 33b of the bridge member 33.

Referring now to FIG. 2b, a longitudinal slot 34 is provided in a side wall of the scanner holder 31. As noted above, the inner diameter of the scanner holder 31 is dimensioned slightly smaller than the outer diameter of the scanner 10 a sufficient amount to form a "tight fit." The slot 34 permits a degree of expansion of the walls of the scanner holder 31 in order to accommodate the insertion of the scanner 10. A similar slot 35 is formed into a side wall of the highlighter holder 32 (see FIG. 2c) to accommodate insertion of highlighter 20.

The fit between the highlighter 20 and the highlighter holder 32 is sufficiently tight to prevent the highlighter 20 from "riding up" into the highlighter holder 32 when pressure is applied to the tip 21 of the highlighter during use. However, the fit is not so tight to prevent the downward adjustment of the highlighter 20 within the highlighter holder 32 as may be necessary from time to time to compensate for wear of the highlighter tip 21.

During use, the scanning tip 11 and highlighter tip 21 are brought into contact with the printed matter to be scanned. In one method of use the user sweeps the combination scanner/highlighter across the page in one direction with the highlighter tip 21 trailing the scanning tip 11. The highlighter leaves a visual and permanent record of what the user has scanned.

The highlighter tip 21 is specially dimensioned to coincide with the field dimension of the scanning "window" of the scanner tip so that by merely seeing the highlighted portions of the printed matter, the user is assured that he has scanned the desired area. In other words, the borders of the highlighter marking tell whether the proper areas are being recorded by the scanning window. This feature, hereinafter denoted as "scan field verification" eliminates the need to continuously call up the scanned graphics or text file in the computer memory to check for accuracy.

The visual record produced by the highlighter tip 21 also facilitates the user by showing whether the user is scanning evenly. The highlighter functions as a ruler or guide for the scanner, since the user can monitor whether he/she is scanning in a straight and even path by reference to the marking of the highlighted area.

In a second method the combination scanner/highlighter may also be used by scanning in the opposite direction so that the scanning tip 11 trails the highlighter tip 21. When used in this fashion, the resolution and contrast capabilities of the scanner are enhanced as the scanner is now scanning highlighted material as opposed to non-highlighted material. This is particularly useful when the contrast between the background paper and foreground print is poor.

An example of a printed document with inherent poor contrast would be a newspaper or magazine. The background paper, being of poor quality, only appears white to the human eye. To the scanner, the background paper appears grey (or off-white) because it picks up other colors and impurities associated with the cheaper newsprint.

Scanners work on the principle of recording changes in the reflected and refracted light emitted from the scanner onto the paper. A scanner will not pick up a color that is the same as the color of the light emitted from the scanner because that color will be absorbed and not reflected or refracted. Most scanners use green or red LEDs as a light source, and therefore are unable to record green and red print, respectively. Halftones and varying shades of gray are also a problem for most scanners because they reflect light and this is perceived as a "weak" black color to the scanner.

By highlighting an area of printed text before it is scanned, the color density is altered. It has been found that a yellow highlight improves contrast for the scanner and therefore a cleaner, crisper image is produced and the digital signal is enhanced, being cleaner (more nearly free of background noise signals). The yellow highlight decreases the greyness and improves contrast in an off-white background because it absorbs light and registers as being white to the scanner.

Referring now to FIGS. 3-6, two alternate embodiments for the combination scanner/highlighter are shown. In FIGS. 3 and 4, a donut-type or annular scanner/highlighter combination is disclosed whereby a highlighter housing 40 is provided for enclosing the bottom end (or scanning tip end) of the scanner 20. Ink-filled highlight material 41 is fitted within the housing 40 and surrounds the scanner tip 11. This scanner/highlighter is bi-directional; that is, the user an scan either direction but in this embodiment the scanner only scans previously highlighted material.

In use, the scanner leaves a rectangular foot print slightly larger than the scanner window 13. This is best seen in FIG. 4. Since the annulus defined by the ink-filled highlight material 41 is marginally larger than the window 13 of the scanner tip 11, all material is assured to be highlighted before it is scanned. Thus, a cleaner imaged is achieved by creating a uniform and predictable contrast between the background paper and the foreground print.

FIGS. 5 and 6 show a second alternate embodiment for the combination scanner/highlighter of the present invention. In this embodiment, the highlighter 45 rides "piggyback" on the scanner 20.

The highlighter 45 is provided with an angled tip portion 45a at its bottom or "highlighter" end so that the highlighter tip 49 is spaced adjacent the scanner tip 11.

A one-piece holder 46 is provided to retain the highlighter 45 in a fixed spaced relationship to the scanner 20. As is best seen in FIG. 6, longitudinal slots 46 and 47 are provided in the side walls of the holder 46 to permit easy insertion of and spring-like grip to the highlighter 45 and scanner 20. The holder 46, being thin-walled and compact, is hardly noticeable to the user. As in the bracket assembly of FIGS. 1 and 2, the outer surface of the holder 46 may be contoured to ergonomically fit the user's hand.

It should be understood that various modifications within the scope of this invention can be made by one of ordinary skill in the art without departing from the spirit thereof. For example the short end(s) 41a and/or 41b may be eliminated from the donut highlighter of FIG. 4 so that the highlighter does not extend beyond the height of the scanner tip, if desired. I therefore wish my invention to be defined by the scope of the appended claims as broadly as the prior art will permit, and in view of the specification if need be.

I claim:

1. An improved text or graphics scanner, for scanning while highlighting selected areas of text or graphics previously applied to a substrate, comprising in operative combination:
   a) a text or graphics scanner adapted for scanning previously printed text or graphics without marking said substrate;
   b) a contract improving colored transparent ink-type highlighter for highlighting background areas of said substrate to which said text or graphics has not been applied to improve the contrast between selected text or graphics areas and remaining non-highlighted areas of said substrate; and
   c) means for securing said highlighter in association with said scanner so that a selected scanned text or graphics area is also highlighted to provide better contrast and have a visual scan field verification record of which areas of the selected text or graphics was scanned.

2. An improved scanner as in claim 1 wherein:
   a) said scanner is a pen-type scanner connectable to a computer by an umbilical; and
   b) said highlighter is a felt tip type highlighter.

3. An improved scanner as in claim 2 wherein:
   a) said highlighter ink is a color which enhances contrast between said selected scanned text or graphics area and the background areas of the substrate.

4. An improved scanner as in claim 1 wherein:
   a) said highlighter is disposed tandem to said scanner.

5. An improved scanner as in claim 3 wherein:
   a) said highlighter is disposed tandem to said scanner.

6. An improved scanner as in claim 1 wherein:
   a) said highlighter surrounds at least a portion of the scanning tip of said scanner.

7. An improved scanner as in claim 3 wherein:
   a) said highlighter surrounds at least a portion of the scanning tip of said scanner.

8. An improved scanner as in claim 1 wherein:
   a) said highlighter is replaceable after being worn out.

9. An improved scanner as in claim 3 wherein:
   a) said highlighter is replaceable after being worn out.

10. An improved scanner as in claim 1 wherein:
    a) said highlighter is removably secured at an angle to said scanner.

11. An improved scanner as in claim 10 wherein:
    a) said highlighter/scanner securing means is angularly adjustable.

12. An improved scanner as in claim 3 wherein:
    a) said highlighter is removably secured at an angle to said scanner.

13. An improved scanner as in claim 12 wherein:
    a) said highlighter/scanner securing means is angularly adjustable.

14. Method of verifying that selected portions of a field has been scanned with a hand held graphics or alphanumeric text scanner of the pen type comprising the steps of:
    a) selected areas of a substrate having said alphanumeric text or graphics thereon, at least selected portions of which are to be scanned with a pen-type scanner;
    b) highlighting said text or graphics portions of said substrate in areas selected for scanning by said pen with a transparent ink color which enhances contrast between background areas of said substrate and said graphics or alphanumeric text;
    c) scanning said selected text or graphics portions while highlighting them so that said highlighter provides a color marking of the areas scanned to give visual verification of the field scanned.

* * * * *